US008648834B2

(12) United States Patent
Wong et al.

(10) Patent No.: US 8,648,834 B2
(45) Date of Patent: Feb. 11, 2014

(54) CONTROLLER AND ADC FOR LOW POWER OPERATION OF TOUCHSCREEN DEVICE

(75) Inventors: Jerome D. Wong, Sunnyvale, CA (US); Mercedes Gil, Fort Collins, CO (US); Zhi Zhong Huang, Pudong (CN); Xu Zhang, Pudong (CN); Xiao Yan Zheng, Pudong (CN)

(73) Assignee: Pixart Imaging, Inc., Hsin-Chu (TW)

( * ) Notice: Subject to any disclaimer, the term of this patent is extended or adjusted under 35 U.S.C. 154(b) by 284 days.

(21) Appl. No.: 13/108,700

(22) Filed: May 16, 2011

(65) Prior Publication Data

US 2012/0293444 A1 Nov. 22, 2012

(51) Int. Cl.
*G06F 3/045* (2006.01)
(52) U.S. Cl.
USPC ............................................... 345/174
(58) Field of Classification Search
None
See application file for complete search history.

(56) References Cited

U.S. PATENT DOCUMENTS

| 7,085,663 | B1 | 8/2006 | Tsyrganovich | |
|---|---|---|---|---|
| 7,129,874 | B2 | 10/2006 | Bjornsen | |
| 7,142,140 | B2 | 11/2006 | Storvik et al. | |
| 7,205,923 | B1 * | 4/2007 | Bahai | 341/161 |
| 7,672,359 | B2 | 3/2010 | Cleary et al. | |
| 2010/0156684 | A1 | 6/2010 | Westwick et al. | |
| 2010/0156850 | A1 * | 6/2010 | Kurokawa | 345/175 |
| 2010/0265210 | A1 * | 10/2010 | Nakanishi et al. | 345/174 |
| 2010/0321214 | A1 * | 12/2010 | Wang et al. | 341/20 |
| 2010/0328259 | A1 * | 12/2010 | Ishizaki et al. | 345/174 |
| 2011/0096875 | A1 * | 4/2011 | Amrutur et al. | 375/343 |
| 2012/0176326 | A1 * | 7/2012 | Lin et al. | 345/173 |

OTHER PUBLICATIONS

Preliminary Product Data Sheet entitled "AMRI-5200 Low-Power 10-Touch Controller" Apr. 20, 2011, Avago Technologies.

* cited by examiner

*Primary Examiner* — Joseph Haley
*Assistant Examiner* — Emily Frank
(74) *Attorney, Agent, or Firm* — McClure, Qualey & Rodack, LLP

(57) ABSTRACT

Various embodiments of a low-power-consumption analog-to-digital converter ("ADC") for a touchscreen or touch panel in a capacitive sensing system are disclosed. The ADC is configured to operate in a first mode or a second mode. The first mode is characterized by a first resolution having a first number of ADC bits and a first level of power consumption associated therewith. The second mode is characterized by a second resolution having a second number of bits and a second level of power consumption associated therewith. The ADC operates under control of the controller and is configured such that the first number of bits is greater than the second number of bits and the first power level is greater than the second power level. The controller causes the ADC to switch from operating in the first mode to operating in the second mode when low radio frequency (RF) noise conditions are detected by sense circuitry, the ADC and/or the controller.

38 Claims, 10 Drawing Sheets

CONTROLLER AND ADC FOR LOW POWER OPERATION OF TOUCHSCREEN DEVICE

FIELD OF THE INVENTION

Various embodiments of the invention described herein relate to the field of touchscreen or touchpad systems, devices, components and methods configured to detect touches on a touchscreen or touch panel using capacitive sensing techniques, and to provide digitized output signals indicative of such touch positions.

BACKGROUND

Controllers for touchscreen devices send the position-dependent signals generated by the touchscreens to analog to digital converters (ADCs) to be digitized before further processing is carried out to extract the positional information of interest. In cases where the devices are intended to be operated in environments with high RF noise, sophisticated digital filters may be applied to the ADC output signals. One example of a controller that uses this approach is the AMRI-5200 manufactured by Avago Technologies.

However, errors from the particular noise algorithms and cumulative arithmetic errors inherent to the use of digital filters may cause significant loss of precision in the filtered signal. To allow for this loss of precision, the ADC is designed to provide several more bits of signal precision at the filter input than are actually required at the filter output. Unfortunately, the use of a high precision ADC increases power consumption.

The issue of power consumption is particularly important for mobile consumer devices, as it has an obvious impact on battery life. However, it is reasonable to expect low to moderate RF noise in the mobile consumer device environment, except under extreme, infrequently occurring circumstances. The degree of digital filtering required in more typical circumstances is reduced, in turn requiring less precision in the ADC, and reducing power consumption.

What is needed is a touchscreen system, and method of operating such a system, that can switch between two modes, one for low noise situations, in which high ADC precision is not required, and one for high noise or other exceptional situations, when the power penalty associated with high ADC precision may be justified.

SUMMARY

According to one embodiment, there is provided a capacitive touchscreen or touch panel system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a controller operably connected to the first plurality of drive electrodes and the second plurality of sense electrodes, the controller comprising an analog-to-digital converter (ADC) configured to operate in a first mode characterized by a first resolution having a first number of ADC bits and a first level of power consumption associated therewith, and to operate in a second mode characterized by a second resolution having a second number of bits and a second level of power consumption associated therewith, the ADC operating under control of the controller and being configured such that the first number of bits is greater than the second number of bits and the first power level is greater than the second power level, the controller being configured to cause the ADC to switch from operating in the first mode to operating in the second mode when low radio frequency (RF) noise conditions are detected by one of the sense circuitry, the ADC and the controller.

According to another embodiment, there is provided a method of operating a capacitive touchscreen or touch panel system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a controller operably connected to the first plurality of drive electrodes and the second plurality of sense electrodes, the controller comprising an analog-to-digital converter (ADC) configured to operate in a first mode characterized by a first resolution having a first number of ADC bits and a first level of power consumption associated therewith, and to operate in a second mode characterized by a second resolution having a second number of bits and a second level of power consumption associated therewith, the ADC operating under control of the controller and being configured such that the first number of bits is greater than the second number of bits and the first power level is greater than the second power level, the method comprising switching the ADC from operating in the first mode to operating in the second mode when low radio frequency (RF) noise conditions are detected by one of the sense circuitry, the ADC and the controller.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Figure 1:
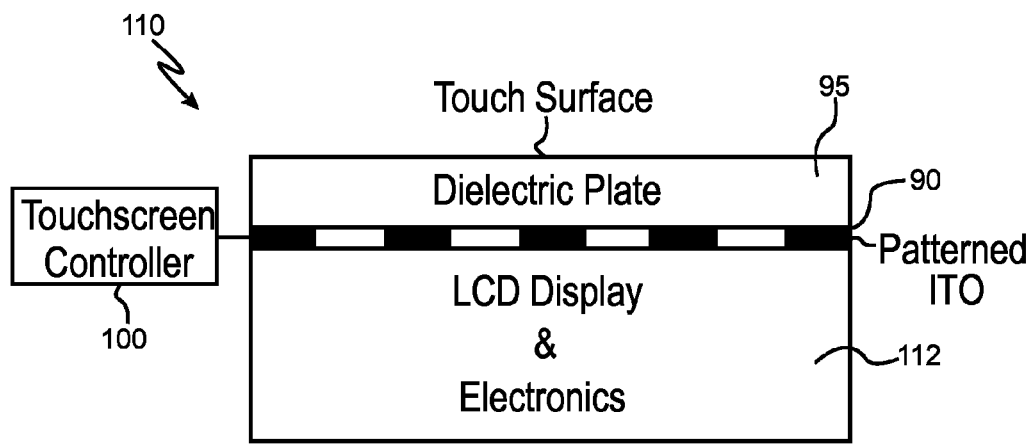
FIG. 1 shows a cross-sectional view of one embodiment of a capacitive touchscreen system.

As illustrated in FIG. 1, a capacitive touchscreen system 110 typically consists of an underlying LCD or OLED display 112, an overlying touch-sensitive panel or touchscreen 90, a protective cover or dielectric plate 95 disposed over the touchscreen 90, and a touchscreen controller, micro-processor, application specific integrated circuit ("ASIC") or CPU 100. Note that image displays other than LCDs or OLEDs may be disposed beneath touchscreen 90.

Figure 2:
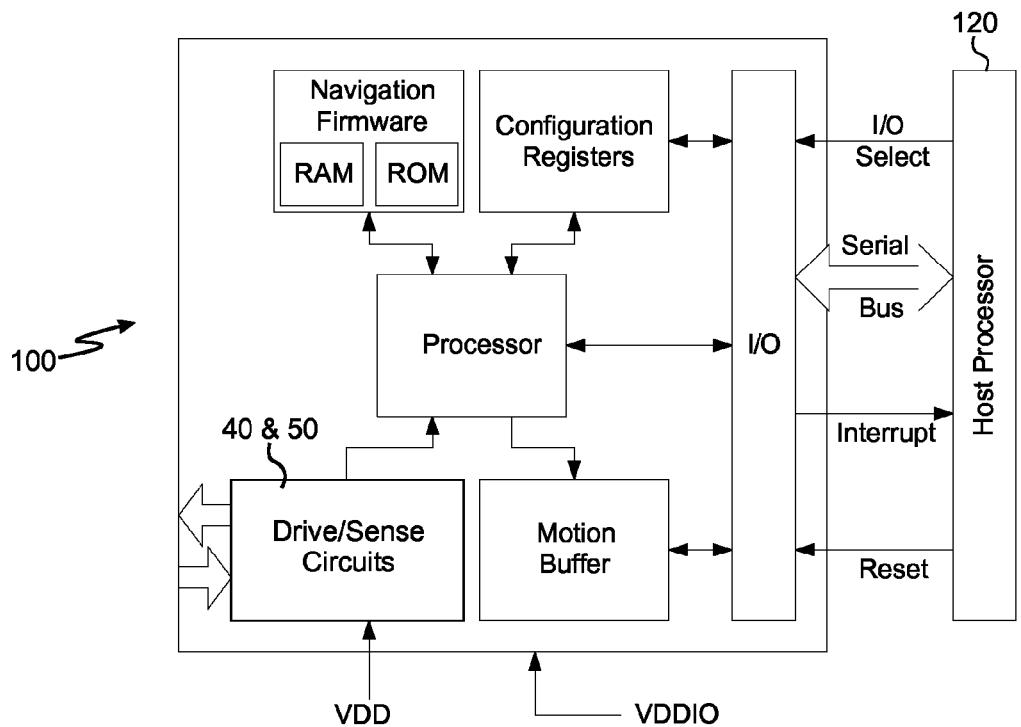
FIG. 2 shows a block diagram of a capacitive touchscreen controller.

FIG. 2 shows a block diagram of one embodiment of a touchscreen controller 100. In one embodiment, touchscreen controller 100 may be an Avago Technologies™ AMRI-5000 ASIC or chip 100 modified in accordance with the teachings presented herein. In one embodiment, touchscreen controller is a low-power capacitive touch-panel controller designed to provide a touchscreen system with high-accuracy, on-screen navigation.

Figure 3:
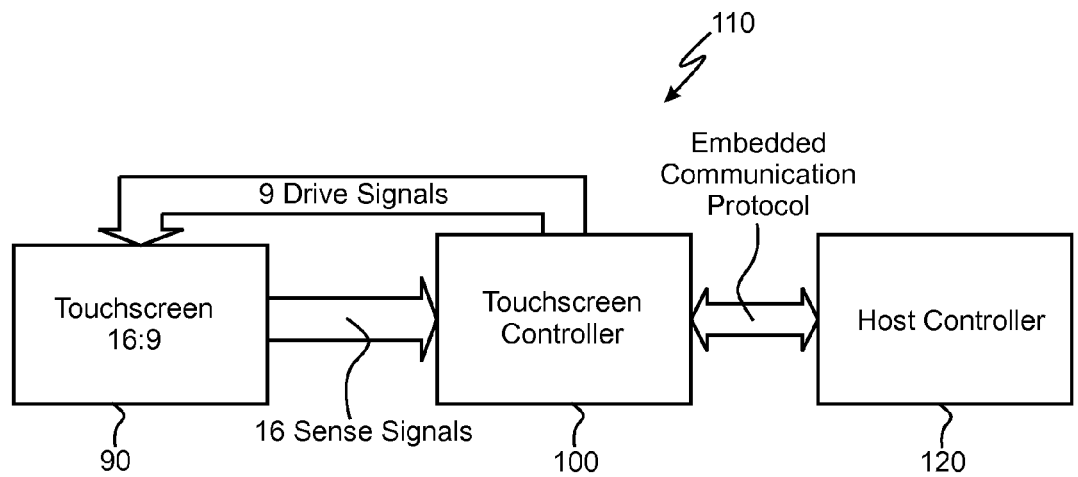
FIG. 3 shows one embodiment of a block diagram of a capacitive touchscreen system and a host controller.
Figure 4:
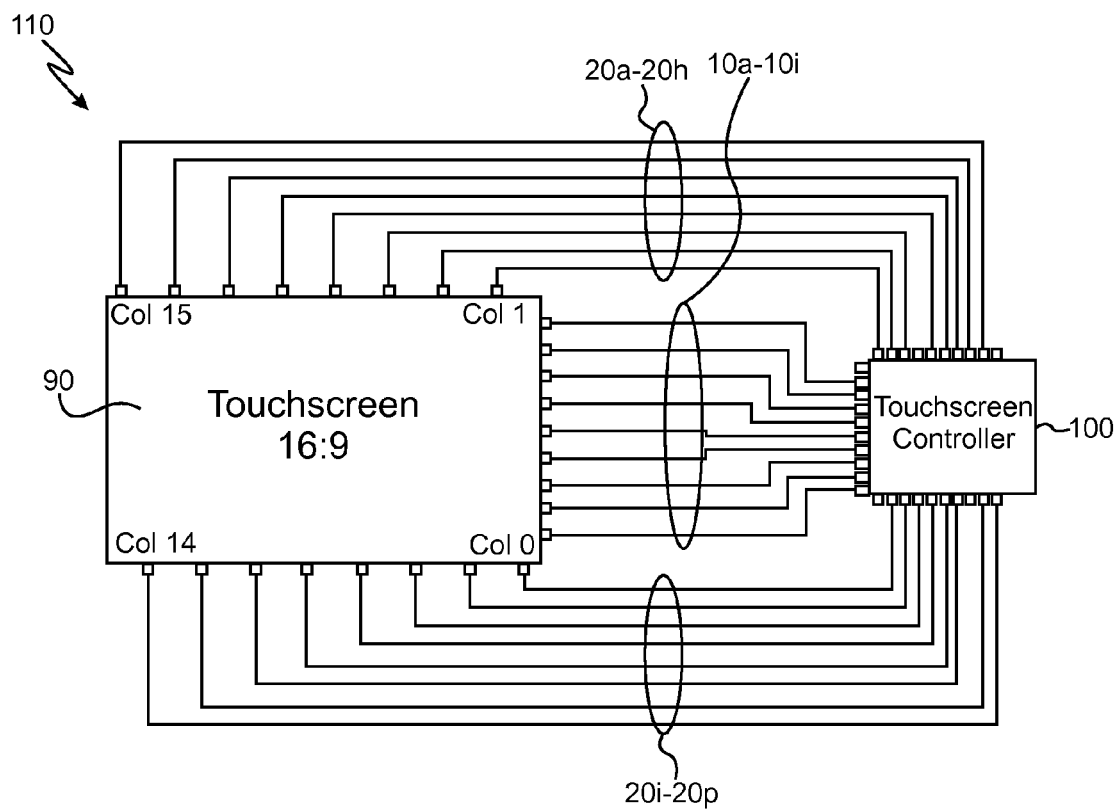
FIG. 4 shows a schematic block diagram of one embodiment of a capacitive touchscreen system.

Capacitive touchscreens or touch panels 90 shown in FIGS. 3 and 4 can be formed by applying a conductive material such as Indium Tin Oxide (ITO) to the surface(s) of a dielectric plate, which typically comprises glass, plastic or another suitable electrically insulative and preferably optically transmissive material, and which is usually configured in the shape of an electrode grid. The capacitance of the grid holds an electrical charge, and touching the panel with a finger presents a circuit path to the user's body, which causes a change in the capacitance.

Touchscreen controller 100 senses and analyzes the coordinates of these changes in capacitance. When touchscreen 90 is affixed to a display with a graphical user interface, on-screen navigation is possible by tracking the touch coordinates. Often it is necessary to detect multiple touches. The size of the grid is driven by the desired resolution of the touches. Typically there is an additional cover plate 95 to protect the top ITO layer of touchscreen 90 to form a complete touch screen solution (see, e.g., FIG. 1).

One way to create a touchscreen 90 is to apply an ITO grid on one side only of a dielectric plate or substrate. When the touchscreen 90 is mated with a display there is no need for an additional protective cover. This has the benefit of creating a thinner display system with improved transmissivity (>90%), enabling brighter and lighter handheld devices. Applications for touchscreen controller 100 include, but are not limited to, smart phones, portable media players, mobile internet devices (MIDs), and GPS devices.

Referring now to FIGS. 3 and 4, in one embodiment the touchscreen controller 100 includes an analog front end with 9 drive signal lines and 16 sense lines connected to an ITO grid on a touchscreen. Touchscreen controller 100 applies an excitation such as a square wave, meander signal or other suitable type of drive signal to the drive electrodes that may have a frequency selected from a range between about 40 kHz and about 200 kHz. The AC signal is coupled to the sense lines via mutual capacitance. Touching touchscreen or touch panel 90 with a finger alters the capacitance at the location of the touch. Touchscreen controller 100 can resolve and track multiple touches simultaneously. A high refresh rate allows the host to track rapid touches and any additional movements without appreciable delay. The embedded processor filters the data, identifies the touch coordinates and reports them to the host. The embedded firmware can be updated via patch loading. Other numbers of drive and sense lines are of course contemplated, such as 8×12 and 12×20 arrays.

Touchscreen controller 100 may feature multiple operating modes with varying levels of power consumption. For example, in rest mode controller 100 may periodically look for touches at a rate programmed by the rest rate registers. There are multiple rest modes, each with successively lower power consumption. In the absence of a touch for a certain interval controller 100 may automatically shift to a lower power consumption mode. However, as power consumption is reduced the response time to touches may increase.

According to one embodiment, and as shown in FIG. 4, an ITO grid or other electrode configuration on touchscreen 90 comprises sense columns 20*a*-20*p* and drive rows 10*a*-10*i*, where sense columns 20*a*-20*p* are operably connected to corresponding sense circuits and rows 10*a*-10*i* are operably connected to corresponding drive circuits. One configuration for routing ITO or other lines from drive and sense electrodes to lines to touchscreen controller 100 is shown in FIG. 4.

Those skilled in the art will understand that touchscreen controllers, micro-processors, ASICs or CPUs other than a modified AMRI-5000 chip or touchscreen controller 100 may be employed in touchscreen system 110, and that different numbers of drive and sense lines, and different numbers and configurations of drive and sense electrodes, other than those explicitly shown herein may be employed without departing from the scope or spirit of the various embodiments of the invention.

Figure 5:
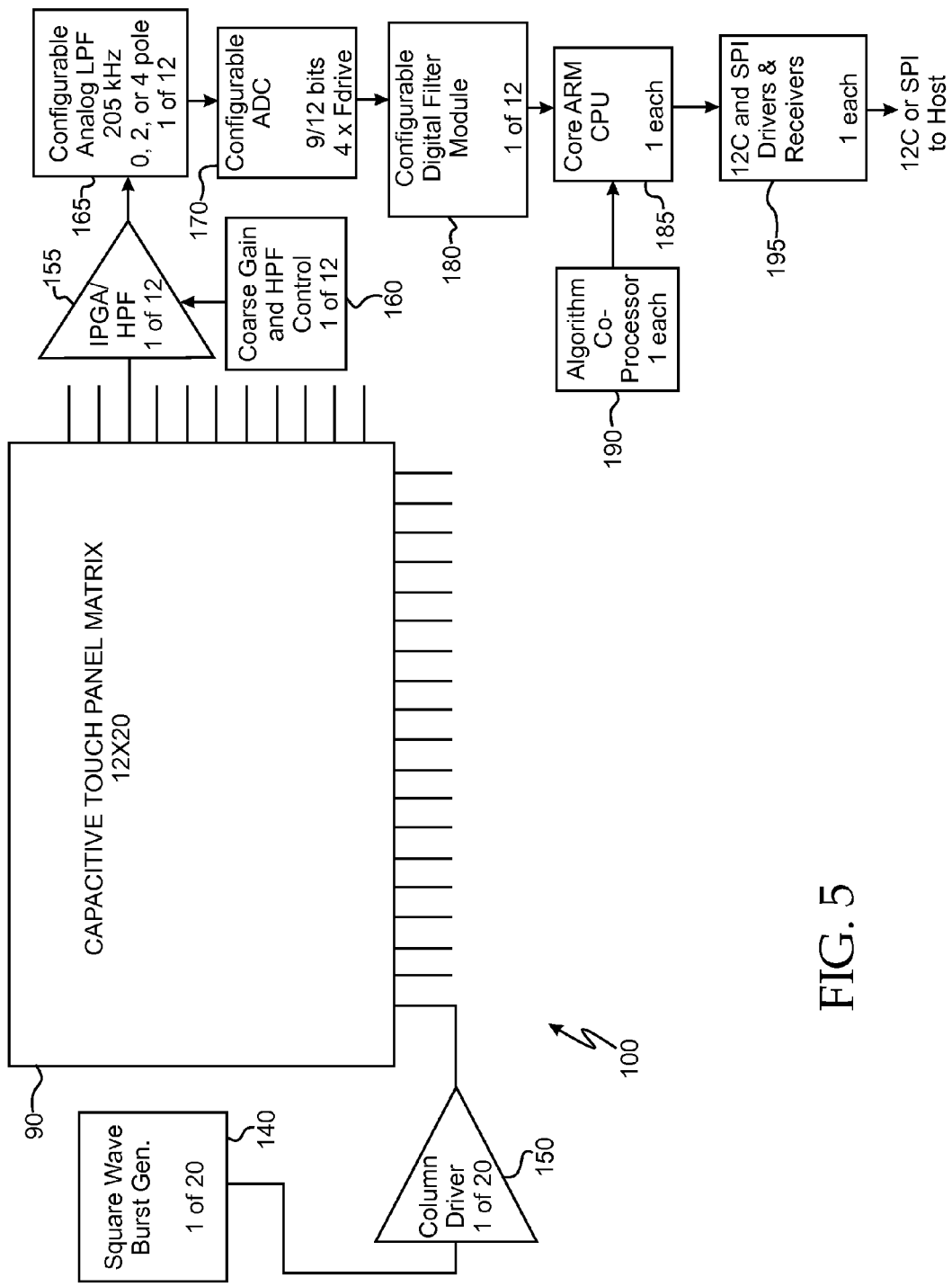
FIG. 5 shows a schematic block diagram of one embodiment of a system controller.

FIG. 5 shows a schematic diagram of the AMRI-5200 touchscreen system controller 100. A typical mutual-capacitance measurement technique senses capacitive changes on the touch panel matrix or touchscreen 90 by measuring the capacitive coupling between the driver signals, supplied by square wave burst generators 140 through column drivers 150, and the corresponding signals output from the sense interstitial pin grid array (IPGA) pins shown on the right hand side of touch panel matrix 90. It should be noted that although only one generator 140 and one driver 150 are shown explicitly in the figure, other configurations are also contemplated, such as one for each column or row of the array. The sensed signals are amplified and high pass filtered by amplifier elements 155 controlled by coarse gain and analog filter control elements 160. The gain-adjusted, high-pass-filtered signals are low-pass-filtered by analog filters 165, and then digitized by configurable ADCs 170 before they are input to configurable digital filtering modules 180. It should be noted that although only one each of amplifier element 155, control element 160, low-pass filter 165, ADC 170, and configurable digital filter module 180 are shown, other configurations of such components are contemplated, such as one set for each row or column of array 90. The signals output from the digital filtering modules 180 are provided to the controller CPU 185, which extracts touch and/or gesture information using algorithm co-processor 190. The resulting data are sent through external interface 195 to host controller 120.

According to one embodiment discussed below, ADC 170 is scaled to operate at only one of two levels, for 12-bit operation or 9-bit operation. However, the invention is not limited to such an embodiment. The ADCs may be scaled to operate at 12-bit and 10-bit precisions, for example, or at 11-bit, 9-bit or 8-bit precisions. Moreover, the invention is not limited to carrying out a single scaling step between these two extremes. For example, the ADC may be scaled smoothly between the extremes of 12-bit and 8-bit operation to operate at any of five levels, 12-bit, 11-bit, 10-bit, 9-bit or 8-bit according to the degree of precision required. Each level is characterized by a corresponding value of power consumption, so the lowest precision necessary may be chosen to minimize power consumption correspondingly.

Figure 6:
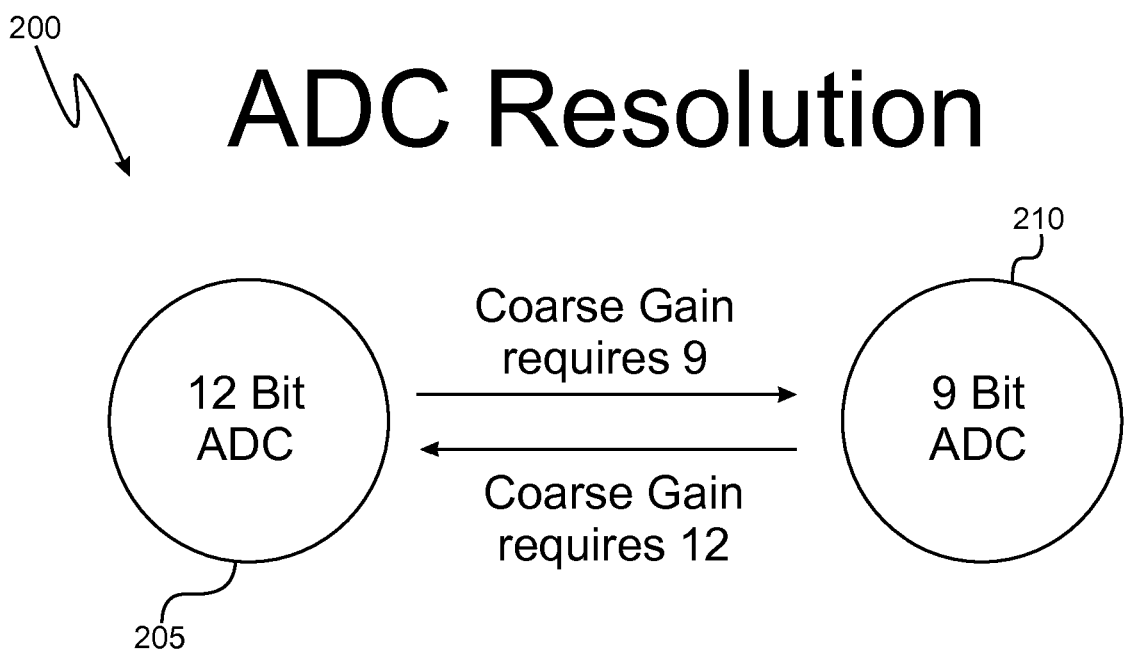
FIG. 6 shows one embodiment of a state diagram for an ADC.

FIG. 6 shows a state diagram 200 for controlling the ADC resolution, by switching between a high resolution (12-bit) state 205 and a low resolution (9-bit) state 210 as needed. The states are determined by the values of coarse gain CG used by the coarse gain and filter control element 160. Coarse gain operation is in turn determined by three factors: (1) the value of the input signal; (2) the frequency with which signal clips are detected; and (3) the particular digital filtering algorithms that are to be used.

First, if the value of the input signal is high, which may indicate a high level of ambient noise, a lower value of coarse gain is used, and hence, 12-bit resolution may be required to achieve fine signal resolutions with such a reduced gain. Second, if the input signal includes noise spikes that cause clipping, then lower gain is used, and hence, 12-bit resolution may be required. Third, depending on the particular noise filtering algorithms used, either high or low resolution digitization may be appropriate.

Figure 7:
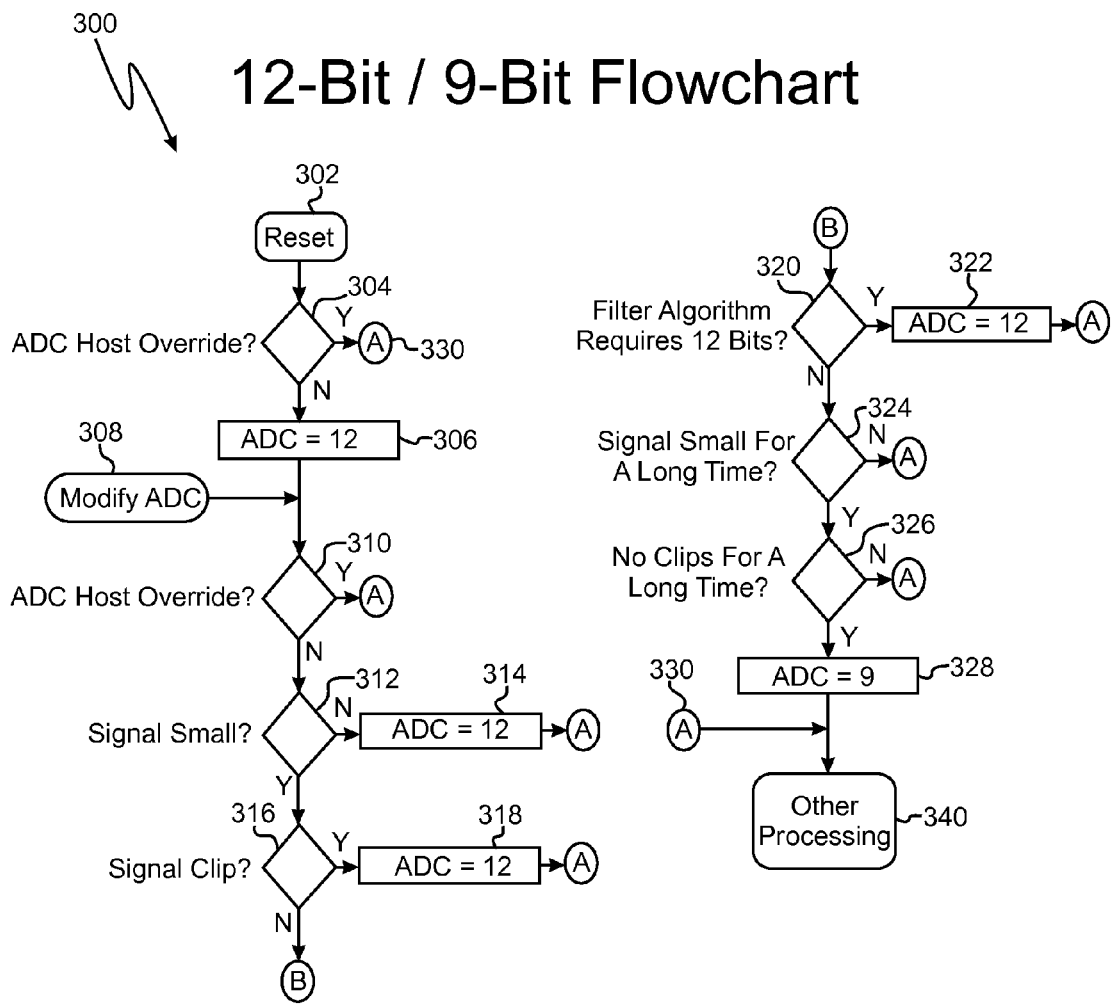
FIG. 7 shows a flowchart according to one embodiment of a method for controlling an ADC operable in 12-bit or 9-bit modes.

In FIG. 7, method 300 for choosing the appropriate ADC precision begins either with a system reset at step 302, and a subsequent check at step 304 for a host override signal, or with the normal entry point at step 308. In the case of a system reset, if an override is detected, control passes to step 330, and the controller carries out whatever other processing is deemed necessary at step 340. In the absence of an override signal, the default ADC precision level of 12-bit resolution is set at step 306. In the more typical normal entry point 306, or after the steps 302 through 306 just discussed, control passes to step 310.

If a host override signal is detected at step 310, control passes to step 330 and the controller carries out whatever other processing is deemed necessary at step 340. If no host override signal is detected at step 310, the method determines at step 312 whether the signal may be classified as "small". If the signal is not classified as small, the ADC resolution is maintained at 12-bits (or set to 12 bits if the level was previously changed at step 328 in a previous pass of the method) at step 314, and control passes to step 330. If the signal can be classified as "small", at step 316, it is determined whether significant signal clipping is present. If this is the case, the ADC resolution is maintained at 12-bits (or set to 12 bits if the level was previously changed at step 328 in a previous pass of the method) at step 318 and control passes to step 330. If there is no significant clipping, at step 320 it is determined whether the particular filter algorithm that is to be employed requires the signal entering the filter to have 12-bit resolution. If so, ADC resolution is maintained at 12-bits at step 322 (or set to 12 bits if the level was previously changed at step 328 in a previous pass of the method) and control passes to step 330. If the filter algorithm does not require such high resolution, at step 324 it is determined whether the "small" signal has been small for a long time. If not, control passes to step 330. If the signal has been small for a long time, at step 326 it is determined whether there has been a long time interval since any signal clips have been detected. If not, i.e., if clips have been detected relatively recently, control passes to step 330. If it has been a long period of time since signal clips have been detected, the ADC resolution is set to 9-bits at step 328, control passes to step 330, and then the controller carries out whatever other processing is deemed necessary at step 340.

According to one embodiment, the ADC has a 12-bit pipelined, differential-input architecture, with an input common mode reference of 0.9V and a dynamic range ranging between about 0.45 volts and about 1.35 volts. Simulated electrical characteristics of such an ADC are listed below in Table 1 below.

TABLE 1

ADC Electrical Characteristics According to One Embodiment

| Parameter | MIN | TYP | MAX | Unit | Condition/Comment |
|---|---|---|---|---|---|
| DC Accuracy | | | | | |
| Resolution | | 12 | | bits | |
| Conversion Rate | | | 10 | MSPS | |
| No Missing Code | 12 | | | Bits | Assured |
| Differential Nonlinearity, DNL | −1.0 | ±0.5 | 1.0 | LSB | |
| Integral Nonlinearity, INL | −2.0 | ±1.0 | 2.0 | LSB | |
| Offset Error | −0.75 | ±0.25 | 0.75 | % FS | |
| Gain Error | −2.5 | ±1.0 | 2.5 | % FS | |
| Power Supply | | | | | |
| Supply (Analog, Digital), VDD | 1.6 | 1.8 | 2.0 | V | |
| Temperature, T | −20 | 27 | 85 | ° C. | Operation Temperature |
| Power Dissipation, IDD | 2.0 | 3.0 | 4.0 | mA | Vin = FS |
| Power Down | 1 | 5 | 10 | uA | No Clock Running |
| Start Up Time | | | 15 | uS | |
| Analog Input | | | | | |
| Input Capacitance | 0.5 | 2 | 4 | pF | Differential |
| Input Common Mode Voltage | 0.85 | 0.9 | 0.95 | V | |
| Input Dynamic Range | — | 0.9 | — | V | Differential input |
| Dynamic Characteristics | | | | | |
| SNDR | 62 | 66 | 70 | dB | Fin = 1-4 MHz, Fs = 10 Msps @Full scale Sine wave, |
| Jitter | 80 | 120 | 200 | pS | Clock RMS Jitter |

Figure 8:
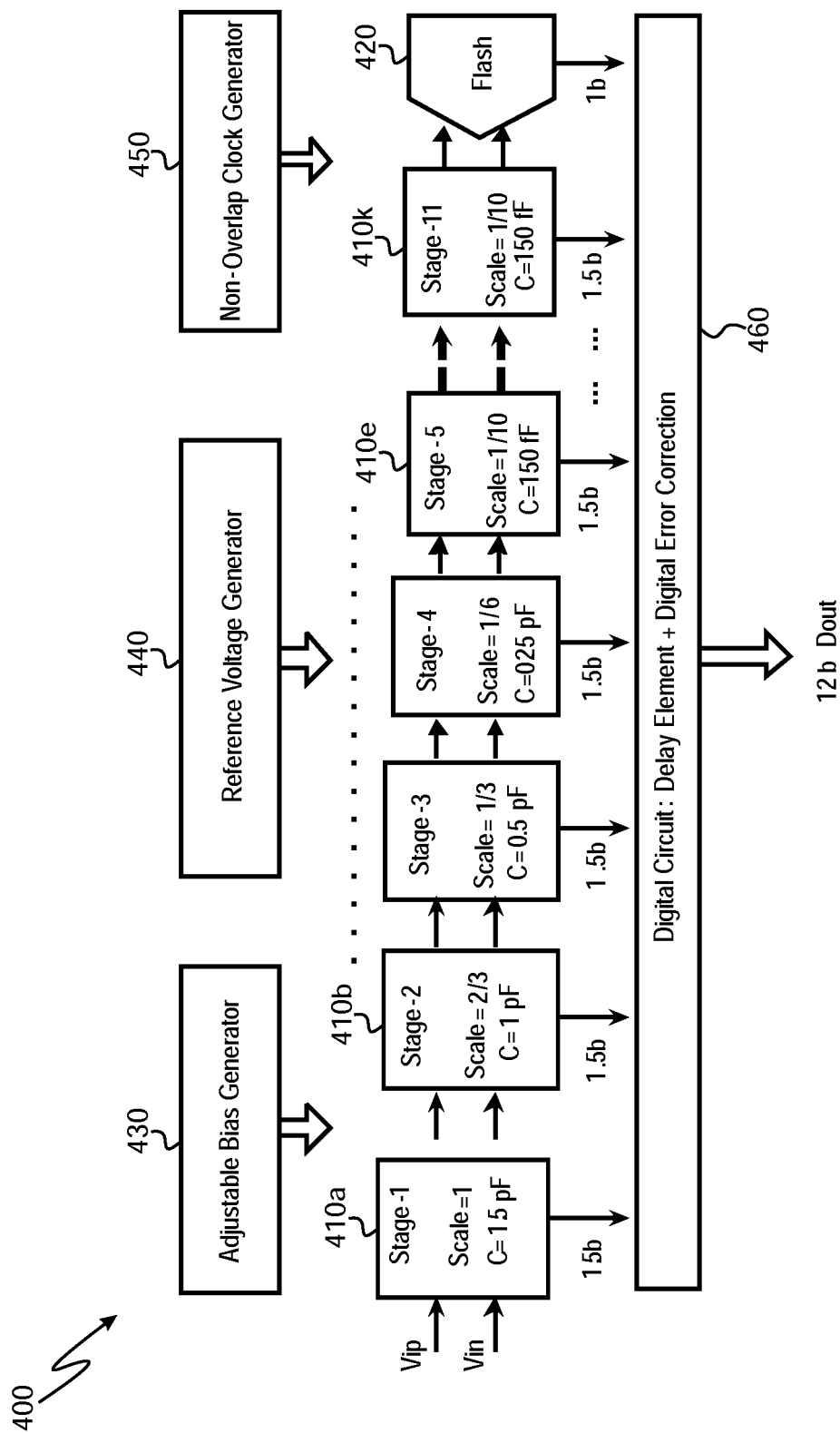
FIG. 8 shows one embodiment of a block diagram for a 12-bit pipelined ADC architecture.

FIG. 8 shows one possible pipelined architecture 400 for such an ADC in block diagram form. The chain consists of 11 successive 1.5-bit stages 410*a* through 410*k*, and a 1-bit Flash 420 at the end. The chain stages scale down from the input (front) to output (back) to save power and area. Since the highest specifications are required for the first stages, the largest values of capacitance are required for the corresponding capacitors in such first stages, scaling down sequentially for the following stages. For example, if the first stage is taken as having a scaling factor of 1, the second as ⅔, the third as ⅓, the fourth as ⅙, and the fifth through tenth stages as ¹⁄₁₀, and if the full scale capacitance is 1.5 pF, the first stage has C=1.5 pf, the second stage has C=1.0 pF, the third stage has C=0.5 pF, the fourth stage has C=0.25 pF, and the fifth through tenth stages have C=0.15 pF.

Inputs from an adjustable bias generator 430, reference voltage generator 440 and non-overlap clock generator 450 are shown at corresponding regions of the ADC chain. Positive and negative input signals Vip and Vin are fed into the first stage 410a. Corresponding positive and negative analog outputs from each stage feed into the next stage in the chain. The digitized output signal from each stage feeds into digital circuit 460, which includes delay elements and performs digital error correction before outputting the 12 bit digitized signal.

Figure 9:
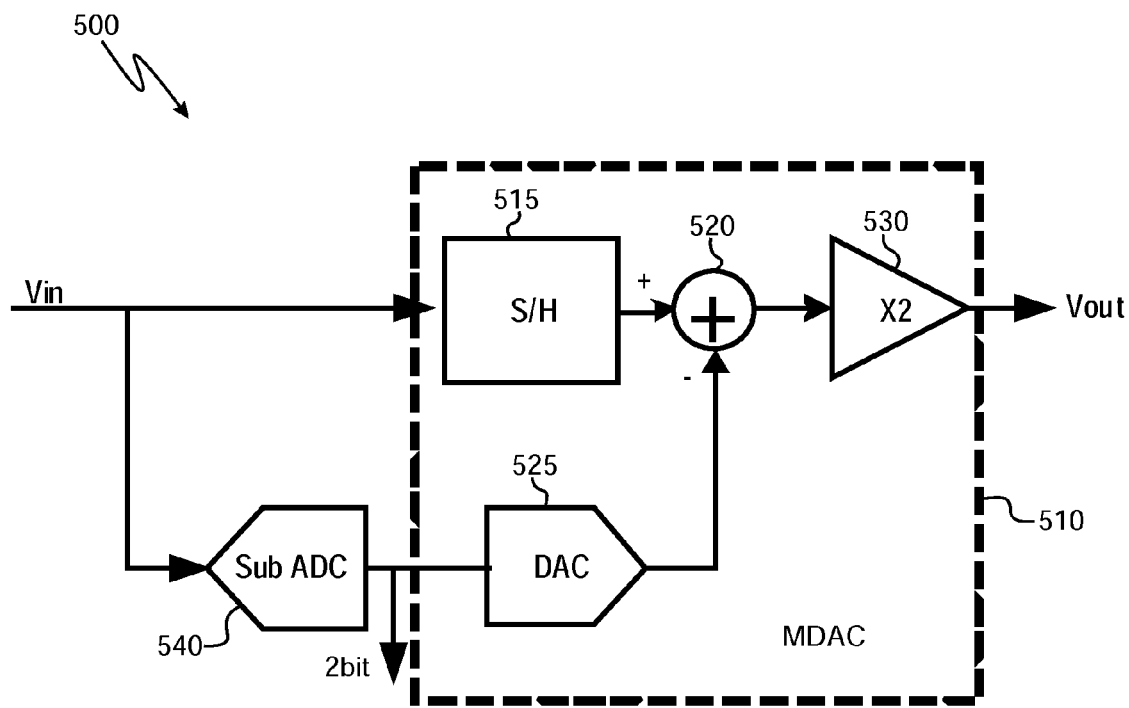
FIG. 9 shows one embodiment of a 1.5 bit stage structure of an ADC.

FIG. 9 shows one embodiment of circuit 500 for one of the 1.5 bit stages of the ADC. Input signal is fed to a multiplying digital to analog converter (MDAC) 510 including sample-and hold circuitry 515, an adder 520, a digital to analog converter (DAC) 525 and a x2 amplifier 530; and to a sub-sampled analog to digital converter 540 (Sub ADC). The signal output by amplifier 530 is fed to the next stage down, while the desired signal representing the digitized output from this stage is provided at a node between sub ADC 540 and DAC 525.

Referring back to FIG. 8, the pipelined architecture shown can be modified by bypassing some stages to achieve, for example, a 9-bit ADC.

Table 2 below shows estimated currents drawn by the various block elements of one embodiment of the ADC. These data show that if power saving is an important objective, it would be most advantageous to bypass the first three stages that process the most significant bits, i.e., the MSB stages.

TABLE 2

One Embodiment of ADC Block Power Estimates

| ADC Blocks | Current (uA) |
| --- | --- |
| -stage 1.5 bit | 700 |
| -stage 1.5 bit | 400 |
| -stage1.5 bit | 250 |
| -stage1.5 bit | 150 |
| - 1.5 bit stages | 700 = 7 × 100 |
| 1 bits Flash | 20 |
| Bias Generator | 20 |
| Reference Voltage Generator | 600 |
| Non Overlap Clock Generator | 80 |
| Digital & Error Correction | 30 |
| Others | 50 |
| Total | 3.00 mA |

Table 3 below shows the pin names and functional descriptions defining ADC interface 195.

TABLE 3

One Embodiment of ADC Interface Definitions

| Pin Name | Function/Description |
| --- | --- |
| Vin | ADC input Signal—negative |
| Vip | ADC input Signal—plus |
| dout<0:11> | ADC output digital code, 12 bits |
| vdda/gnda | ADC supply/ground, 1.8 V/0.0 V, both for analog and digital; |
| vref09 | Band gap refer voltage, 0.9 V |
| clk | Clock signal, max 10 MHz |
| ipt_2u | PTAT current, 2 uA typical |
| Ibg_2u | Bandgap current, 2 uA typical |
| pd | Power down ADC control: '1' power down, '0' power on; |

TABLE 3-continued

One Embodiment of ADC Interface Definitions

| Pin Name | Function/Description |
| --- | --- |
| sel_mode | Select the ADC mode: '0' –12 bits; '1' –9 bits. |
| sel_clk | Select the clock polarity for ADC: '0' rising edge, '1' falling edge. |
| adj_bias<2:0> | Adjust bias current for bias generator—def 010 |
| adj_op1<2:0> | Control bits—default 100 |
| adj_op2<2:0> | Control bits—default 100 |
| adj_op3<2:0> | Control bits—default 100 |
| adj_refbuf<2:0> | Control bits—default 010 |
| vcm_tst | Test output |
| vrefm_tst | Test output |
| vrefp_tst | Test output |

Figure 10:
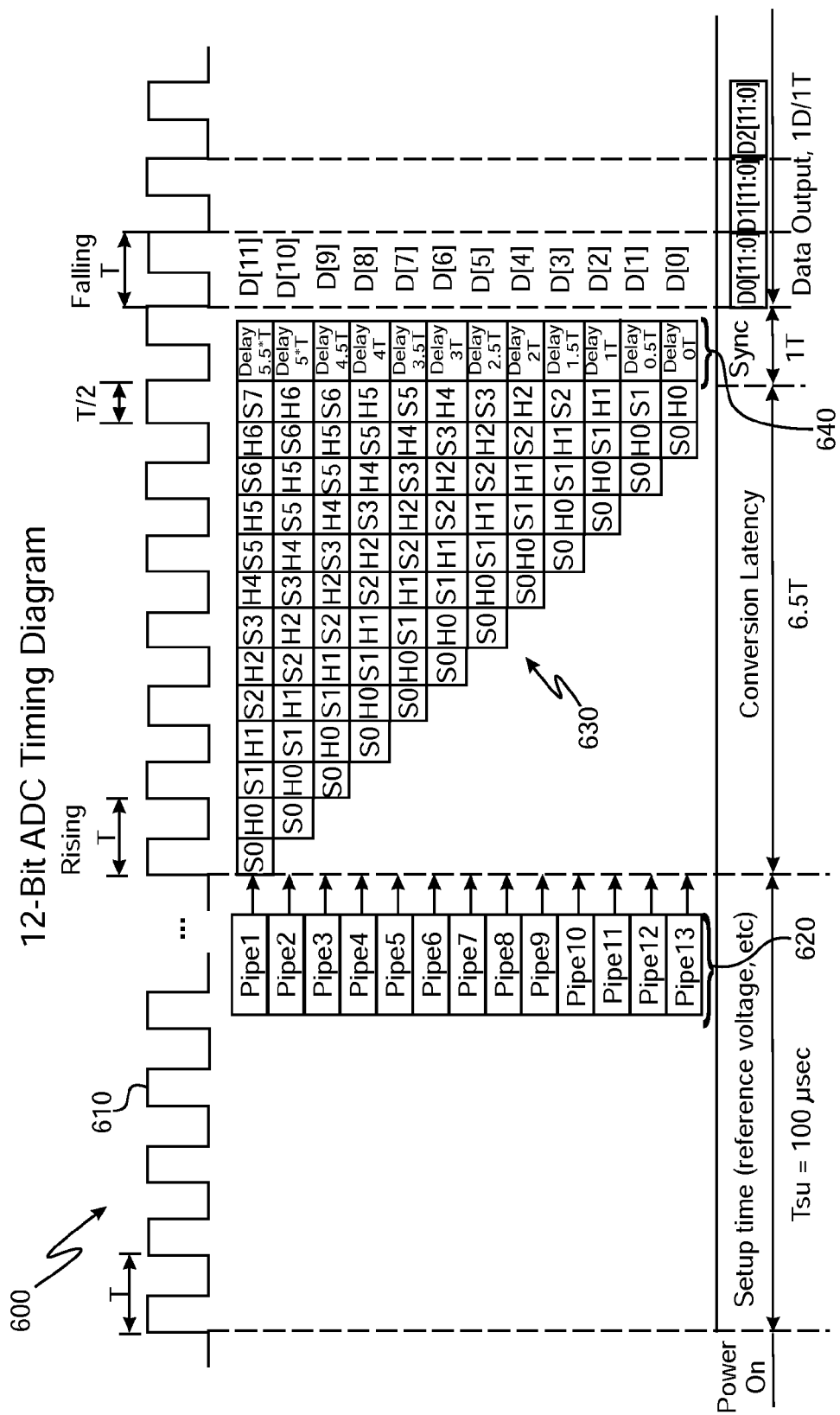
FIG. 10 shows one embodiment of an ADC timing diagram for 12-bit operation.

FIG. 10 shows one embodiment of an ADC timing diagram 600 for 12-bit operation. FIG. 10 shows a stream of clock pulses 610 of time period T beginning at the time that power is switched on. The set up time interval after Power On is about 100 μs. Signals from a series of pipes 620 (Pipe1 through Pipe12) are sequentially fed into the ADC stages on the rising edges of successive clock pulses, and are digitized as shown through a conversion latency time of 6.5 T to provide the bits indicated in cells 630, each bit being associated with a corresponding delay 640. An additional time of IT is taken to synchronize the bit signals. The synchronized bit signals D(0) through D(11) are then output in parallel on the falling edge of the next clock pulse, so that all 12 bits will have been output within a time interval of 7.5 T. The next measurement in the pipeline will be output on the falling edge of the subsequent clock pulse.

Figure 11:
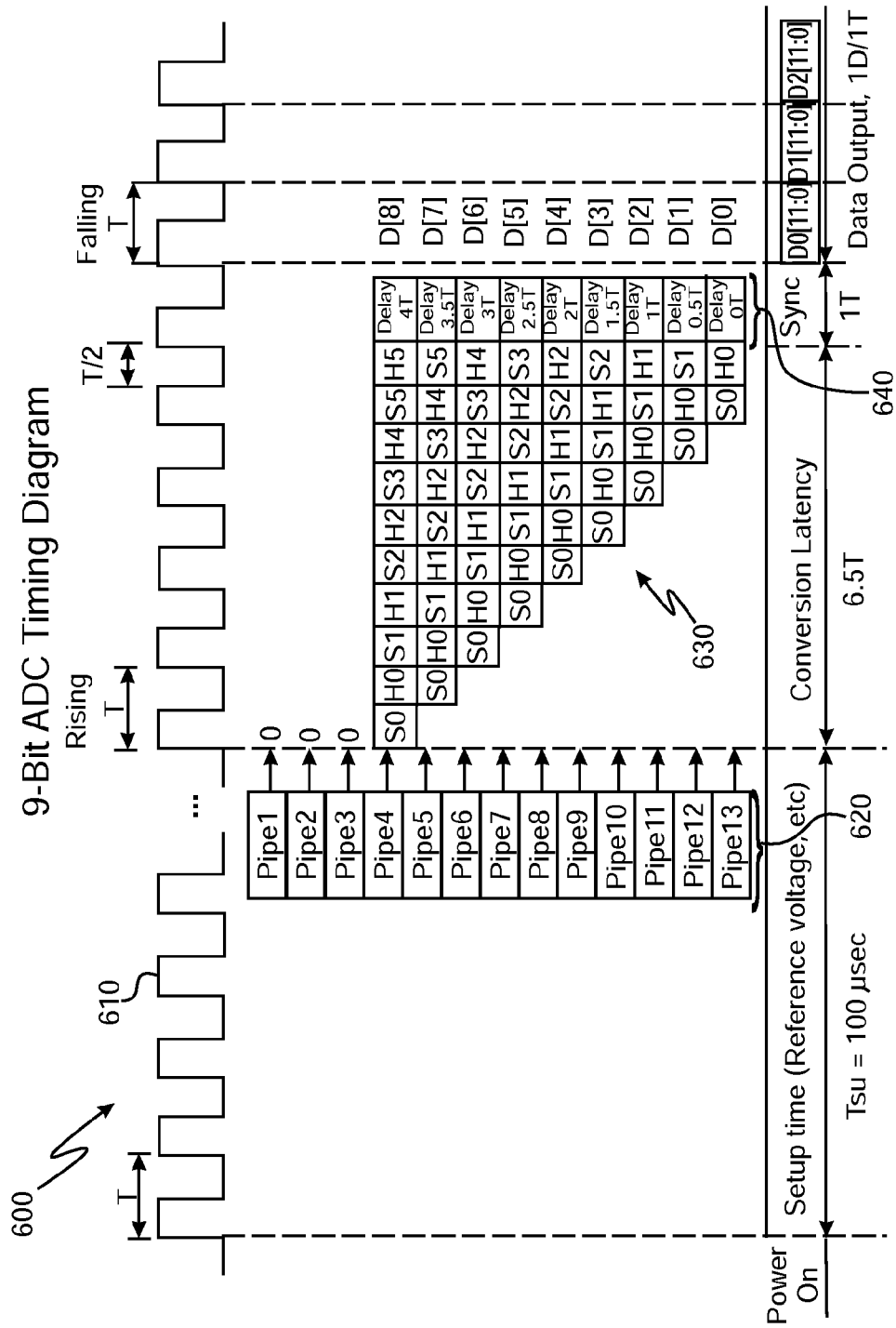
FIG. 11 shows one embodiment of an ADC timing diagram for 9-bit operation.

FIG. 11 shows one embodiment of ADC timing diagram 600 for 9-bit operation. To achieve this lower resolution mode of operation, Pipe1 through Pipe3 are disabled, with their outputs forced to zero volts, and their corresponding input signals, corresponding to the MSB stages, are connected directly to Pipe4. The digitized output signal is made up of synchronized bit signals D(0) through D(8).

Figure 12A:
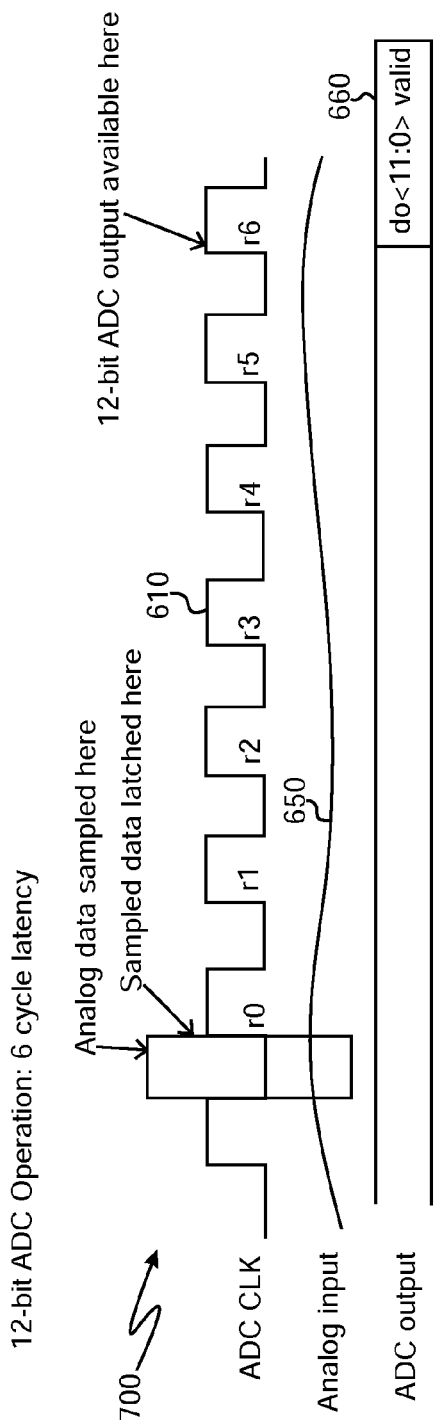
FIGS. 12*a* and 12*b* show some embodiments of ADC timing diagrams for 12-bit and 9 bit operation.
Figure 12B:
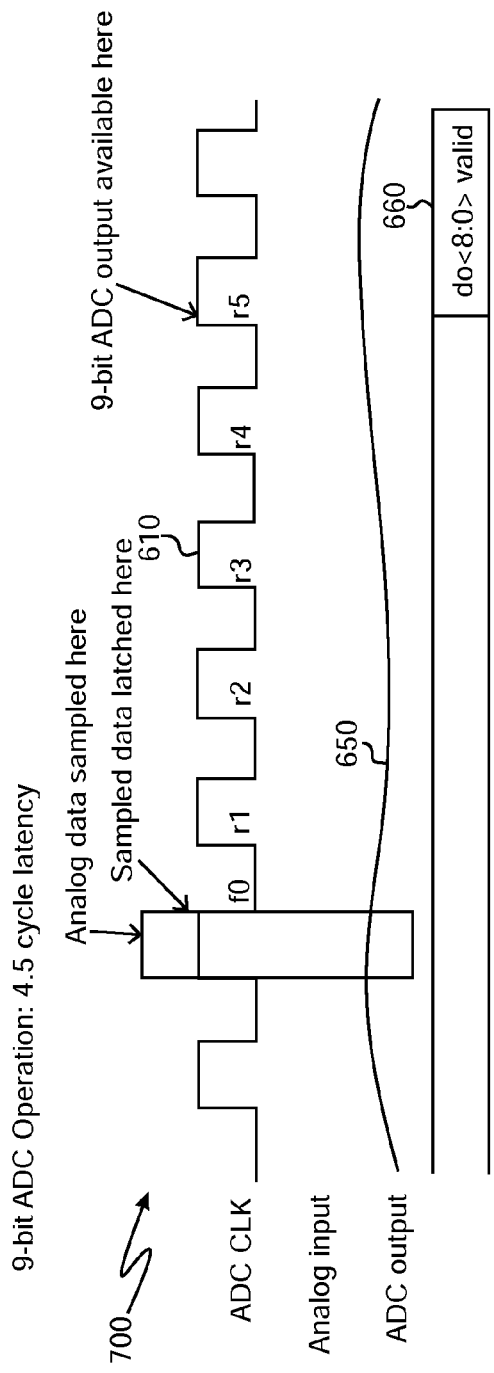

It should be noted that the 12-bit mode of operation and the 9-bit mode of operation differ in their respective conversion latencies. The system requires one half of the ADC clock cycle per ADC bit of resolution. Since both modes produce an ADC output result on a rising edge, the 12-bit mode starts conversion on a rising edge, while the 9-bit mode starts conversion on a falling edge. In both cases, the analog data signal is sampled one half of the ADC clock cycle before the conversion starts. FIG. 12A and FIG. 12B illustrate these points with two embodiments of timing diagram 700, showing the timing relationships between the ADC clock pulse train 610, the analog input signal 650 and the ADC output 660 for the 12-bit and 9-bit modes respectively.

Some aspects of the ADC designs and operations disclosed herein may best be understood by considering the following design calculations.

Power, Speed and Accuracy Trade Off Rule:

$$FOM \Leftrightarrow \frac{Power}{2^{ENOB} \times f_s}$$

where FOM is the appropriate Figure of Merit, ENOB is the effective number of bits, and is the sample rate. This expression makes it clear that: (1) power increases exponentially with an increase in the effective number of bits; and (2)

power varies in direct proportion to the sample rate. As an example, consider switching from a sampling rate of 4 Msps (4 million samples per second) and a 9-bit resolution to a sampling rate of 10 Msps and a 12 bit resolution. The power increases by a factor of for the increase in ENOB alone, and by a factor of 2.5 for the increase in sampling rate alone. So the power actually increases by a total factor of ×2.5 or 20. This means that if a current of 0.5 mA is drawn by the ADC in the former case, 10 mA of current are required in the latter case Thermal Noise:

If we estimate the thermal noise by $$\overline{V_n^2} \approx 4 \times \frac{kT}{C}$$

where $$K=1.38\times10^{-23}(J/K), T=300K; KT=4.14\times10^{-21}J;$$

we find $$\overline{V_n^2} \approx 4 \times \frac{kT}{C} = 4 \times \frac{4.14 \times 10^{-21}}{1.5 \times 10^{-12}} = 1.104 \times 10^{-8};$$

$$\Rightarrow \overline{V_n} = 105 \ uV$$

and the signal to noise and distortion ratio SNDR is given by $$SNDR = \frac{(FSR/2)^2/2}{(FSR/2^N)^2/12 + \overline{V_n^2}} =$$

$$\frac{(1.8/2)^2/2}{(1.8/4096)^2/12 + 1.104 \times 10^{-8}} = \frac{4.05 \times 10^7}{(1.609 + 1.104)} = 71.7 \ dB$$

where FSR is the full scale range.

Capacitance Mismatching:

$$\text{Capacitor Mismatch} \propto \frac{1}{\sqrt{\text{Capacitor Area}}}$$

A useful gain expression for a 1.5 bit stage is calculated as follows:

$$V_o = \left(1 + \frac{C_s}{C_f}\right) \cdot V_i - D(i) \cdot \left(\frac{C_s}{C_f}\right) \cdot V_R - \frac{1}{A}\left(1 + \frac{C_s}{C_f}\right) \cdot V_o;$$

where is the input voltage; is the reference voltage; is the output voltage; $D(i)=-1, 0, +1$; A is the op-amp gain, is the capacitance of the sample capacitor and is the capacitance of the feedback capacitor.

Taking the following definitions, if $C_f = C,$ $C_s = (1+\alpha)C,$ $\frac{C_s}{C_f} = (1+\alpha),$ -continued $$\alpha = \frac{C_s - C_f}{C_f} = \frac{\Delta C}{C}$$

$$V_o = (2+\alpha)\cdot V_i - D(i)(1+\alpha)\cdot V_R - (2+\alpha)\cdot V_o/A$$

$$V_o = \{2V_i - D(i)\cdot V_R\} + \{\alpha(V_i - D(i)\cdot V_R) - (2+\alpha)\cdot V_o/A\}$$

$$V_o = \underbrace{\{2V_i - D(i)\cdot V_R\}}_{\text{Ideal Signal}} + \{\underbrace{\alpha(V_i - D(i)\cdot V_R)}_{\text{Capacitor Mismatch}} - \underbrace{(2+\alpha)\cdot V_o/A}_{\text{Finite opamp gain}}\}$$

The last expression shows that the output voltage can be considered as being made up of the sum of the ideal signal and two error terms, the first due to the capacitor mismatch and the second due to the finite gain of the op-amp.

1) Capacitor Mismatch:

$$\alpha(V_i - D(i)\cdot V_R) = \alpha V_{FS} \leq 1 LSB \Rightarrow \alpha < \frac{1}{2}^{12} = 0.024\%;$$

2) Op-Amp Gain:

$$(2+\alpha)\cdot V_o/A < \frac{1}{4}LSB \Rightarrow$$

$$2V_o/A < \frac{1}{4}LSB \Rightarrow A > 8V_o \cdot 2^N/V_{FS} \approx 2^{N+3} = 90.3 \ dB$$

It is clear that according to one embodiment the stage gain is optimally determined by the ratio of capacitors and. Thus, to ensure a gain which is at least accurate over 12 bits, and. must match to at least 12-bit accuracy or within 0.02% for the first stage in the pipeline. To obtain at least 0.01% matching, a high quality capacitor such as a MIM capacitor is used. If properly designed in layout, MIM capacitors can achieve matching within 0.01%.

Aperture Jitter:

The error voltage due to jitter is given by $$V_{err} = A \cdot 2\pi f_{in} t_a$$

where is the input signal frequency, and is the aperture jitter time.

The signal to noise ratio SNR is given by $$SNR = 20 \ \log\frac{A}{V_{err}} = -20 \ \log(2\pi f_{in} t_a)$$

where $$t_a = 10^{-SNR/20}/(2\pi f_{in}).$$

For example,

If $SNR = 72$ dB, $$t_a < 10^{-72/20}/(2\pi \times 0.2 \times 10^6) = \frac{39.97}{0.2} pS \approx 200 \ pS$$

or, as another example,

If $SNR = 80$ dB, $$t_a < 10^{-80/20}/(2\pi \times 0.2 \times 10^6) = \frac{15.91}{0.2} pS \approx 80 \ pS$$

Various aspects of the embodiments disclosed herein are employed in the Avago Technologies® AMRI-5200 controller, for which a corresponding Preliminary Product Data Sheet entitled "AMRI-5200 Low-Power 10-Touch Controller" dated Apr. 20, 2011 was filed in an IDS on even date herewith, and which is hereby incorporated by reference herein in its entirety.

Various embodiments of the invention are contemplated in addition to those disclosed hereinabove. The above-described embodiments should be considered as examples of the present invention, rather than as limiting the scope of the invention. In addition to the foregoing embodiments of the invention, review of the detailed description and accompanying drawings will show that there are other embodiments of the present invention. Accordingly, many combinations, permutations, variations and modifications of the foregoing embodiments of the present invention not set forth explicitly herein will nevertheless fall within the scope of the present invention.

We claim:

1. A capacitive touchscreen or touch panel system, comprising:
    a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto;
    drive circuitry operably connected to the first plurality of drive electrodes;
    sense circuitry operably connected to the second plurality of sense electrodes and configured to sense input signals therefrom, and
    a controller operably connected to the first plurality of drive electrodes and the second plurality of sense electrodes, the controller comprising an analog-to-digital converter (ADC) configured to operate in a first mode characterized by a first resolution having a first number of ADC bits and a first level of power consumption associated therewith, and to operate in a second mode characterized by a second resolution having a second number of bits and a second level of power consumption associated therewith, the ADC operating under control of the controller and being configured such that the first number of bits is greater than the second number of bits and the first power level is greater than the second power level, the controller being configured to cause the ADC to switch from operating in the first mode to operating in the second mode according to a value of coarse gain used by a coarse gain and filter control element when low radio frequency (RF) noise conditions are detected by one of the sense circuitry, the ADC and the controller.

2. The touchscreen or touch panel system of claim 1, wherein low RF noise conditions are represented by input signals ranging between about 0 mV and about 1 mV.

3. The touchscreen or touch panel system of claim 1, wherein the ADC is configured to operate in the first mode or in the second mode.

4. The touchscreen or touch panel system of claim 1, wherein the controller is configured to cause the ADC to operate in the first mode as a default mode upon start-up of the touchscreen or touch panel system.

5. The touchscreen or touch panel system of claim 1, wherein the controller is configured to cause the ADC to operate in the first mode as a default mode upon start-up of the touchscreen or touch panel system unless an override signal is received from a host processor operably connected to the controller.

6. The touchscreen or touch panel system of claim 1, wherein the controller is configured to cause the ADC to operate in the first mode when high RF noise conditions are detected by one of the sense circuitry, the ADC and the controller.

7. The touchscreen or touch panel system of claim 6, wherein high RF noise conditions are represented by input signals ranging between about 0 mV and about 10 mV.

8. The touchscreen or touch panel system of claim 1, wherein the controller is configured to cause the ADC to operate in the first mode if a frequency at which input signals are detected to be clipped by one of the sense circuitry, the ADC and the controller exceeds a predetermined threshold.

9. The touchscreen or touch panel system of claim 8, wherein the predetermined threshold corresponds to a frequency exceeding about two clipped signals per second.

10. The touchscreen or touch panel system of claim 1, wherein the controller is configured to cause the ADC to operate in the first mode when noise spikes are detected by one of the sense circuitry, the ADC and the controller.

11. The touchscreen or touch panel system of claim 1, wherein the ADC comprises a pipelined differential-input architecture.

12. The touchscreen or touch panel system of claim 1, wherein when the ADC operates in the first mode most significant bit stages thereof are bypassed.

13. The touchscreen or touch panel system of claim 12, wherein outputs of the most significant bit stages of the ADC are forced to zero volts when the ADC is operating in the first mode.

14. The touchscreen or touch panel system of claim 1, wherein outputs provided by the ADC occur on falling edges of clock pulses.

15. The touchscreen or touch panel system of claim 1, wherein outputs provided by the ADC occur on rising edges of clock pulses.

16. The touchscreen or touch panel system of claim 1, wherein the first mode of the ADC corresponds to 10-bit operation thereof.

17. The touchscreen or touch panel system of claim 1, wherein the second mode of the ADC corresponds to 9-bit operation thereof.

18. The touchscreen or touch panel system of claim 1, wherein the second mode of the ADC corresponds to 8-bit operation thereof.

19. The touchscreen or touch panel system of claim 1, wherein the first mode of the ADC corresponds to 12-bit operation thereof.

20. The touchscreen or touch panel system of claim 1, wherein the touchscreen or touch panel system is included in a portable device.

21. The touchscreen or touch panel system of claim 20, wherein the portable device is a mobile phone.

22. A method of operating a capacitive touchscreen or touch panel system comprising a touchscreen comprising a first plurality of electrically conductive drive electrodes arranged in rows or columns, and a second plurality of electrically conductive sense electrodes arranged in rows or columns arranged at an angle with respect to the rows or columns of the first plurality of electrodes, mutual capacitances existing between the first and second pluralities of electrodes at locations where the first and second pluralities of electrodes intersect, the mutual capacitances changing in the presence of one or more fingers of a user or touch devices brought into proximity thereto, drive circuitry operably connected to the first plurality of drive electrodes, sense circuitry operably connected to the second plurality of sense electrodes and configured to sense input signals therefrom, and a controller operably connected to the first plurality of drive electrodes and the second plurality of sense electrodes, the controller comprising an analog-to-digital converter (ADC) configured to operate in a first mode characterized by a first resolution having a first number of ADC bits and a first level of power consumption associated therewith, and to operate in a second mode characterized by a second resolution having a second number of bits and a second level of power consumption associated therewith, the ADC operating under control of the controller and being configured such that the first number of bits is greater than the second number of bits and the first power level is greater than the second power level, the method comprising:

switching the ADC from operating in the first mode to operating in the second mode according to a value of coarse gain used by a coarse gain and filter control element when low radio frequency (RF) noise conditions are detected by one of the sense circuitry, the ADC and the controller.

23. The method of claim 22, wherein low RF noise conditions are represented by input signals ranging between about 0 mV and about 1 mV.

24. The method of claim 22, further comprising the ADC operating in the first mode as a default mode upon start-up of the touchscreen or touch panel system.

25. The method of claim 22, further comprising ADC operating in the first mode as a default mode upon start-up of the touchscreen or touch panel system unless an override signal is received from a host processor operably connected to the controller.

26. The method of claim 22, further comprising the ADC operating in the first mode when high RF noise conditions are detected by one of the sense circuitry, the ADC and the controller.

27. The method of claim 26, wherein high RF noise conditions are represented by input signals ranging between about 0 mV and about 10 mV.

28. The method of claim 22, further comprising the ADC operating in the first mode if a frequency at which input signals are detected to be clipped by one of the sense circuitry, the ADC and the controller exceeds a predetermined threshold.

29. The method of claim 28, wherein the predetermined threshold corresponds to a frequency exceeding about two clipped signals per second.

30. The method of claim 22, further comprising the ADC operating in the first mode when noise spikes are detected by one of the sense circuitry, the ADC and the controller.

31. The method of claim 22, further comprising most significant bit stages of the ADC being bypassed when the ADC is operating in the first mode.

32. The method of claim 22, further comprising forcing outputs of most significant bit stages of the ADC to zero volts when the ADC is operating in the first mode.

33. The method of claim 22, further comprising providing outputs from the ADC on falling edges of clock pulses.

34. The method of claim 22, further comprising providing outputs from the ADC on rising edges of clock pulses.

35. The method of claim 22, wherein the second mode of the ADC corresponds to 10-bit operation thereof.

36. The method of claim 22, wherein the second mode of the ADC corresponds to 9-bit operation thereof.

37. The method of claim 22, wherein the second mode of the ADC corresponds to 8-bit operation thereof.

38. The method of claim 22, wherein the first mode of the ADC corresponds to 12-bit operation thereof.

* * * * *